United States Patent [19]

Schulmerich et al.

[11] Patent Number: 5,401,301
[45] Date of Patent: Mar. 28, 1995

[54] DEVICE FOR THE TRANSPORT OF MATERIALS AND ELECTROSTATIC PRECIPITATION

[75] Inventors: Christian Schulmerich, Nidderau; Wilhelm Moeller, Neu-Isenburg, both of Germany

[73] Assignee: Metallgesellschaft Aktiengesellschaft, Frankfurt am Mai, Germany

[21] Appl. No.: 142,398

[22] PCT Filed: Jul. 14, 1992

[86] PCT No.: PCT/EP92/01581

§ 371 Date: Nov. 19, 1993

§ 102(e) Date: Nov. 19, 1993

[87] PCT Pub. No.: WO93/02312

PCT Pub. Date: Feb. 4, 1993

[30] Foreign Application Priority Data

Jul. 17, 1991 [DE] Germany .......... 41 23 617.3

[51] Int. Cl.[6] .................................. B03C 3/49
[52] U.S. Cl. .................................. 96/71; 55/DIG. 38;
  95/73; 95/78; 96/72; 96/100; 138/111; 428/118
[58] Field of Search .......................... 96/69–72,
  96/98, 100, 52; 95/78, 73; 55/DIG. 38;
  428/116–118; 138/111, 112

[56] References Cited

U.S. PATENT DOCUMENTS

| 2,577,120 | 12/1951 | Franz | 138/111 X |
|---|---|---|---|
| 2,997,519 | 8/1961 | Hines et al. | 55/DIG. 38 |
| 3,485,596 | 12/1969 | Alleaume | 428/118 X |
| 3,676,173 | 7/1972 | Adams | 428/118 X |
| 3,793,802 | 2/1974 | Hardt | 55/DIG. 38 |
| 4,155,792 | 5/1979 | Gelhaar et al. | 55/DIG. 38 |
| 4,441,897 | 4/1984 | Young et al. | 96/36 |
| 4,804,020 | 2/1989 | Bartholomew | 138/112 X |
| 4,869,736 | 9/1989 | Ivester et al. | 96/100 |
| 5,069,254 | 12/1991 | Vogelsang | 138/111 |

FOREIGN PATENT DOCUMENTS

| 1533891 | 7/1968 | France . | |
| 963868 | 5/1957 | Germany . | |
| 2641114 | 3/1978 | Germany . | |
| 3900553 | 12/1989 | Germany | 55/DIG. 38 |
| 4117973 | 12/1992 | Germany | 55/DIG. 38 |

*Primary Examiner*—Richard L. Chiesa
*Attorney, Agent, or Firm*—Michael J. Striker

[57] ABSTRACT

The invention describes a device for transporting materials which has at least a first pipe (I) and a second pipe (II), each having a six-cornered, honeycomb-shaped flow cross section, the first pipe (I) having at least two first wall parts (1) which are not arranged adjacent to one another and whose longitudinal edges (1') are arranged at a first distance (a) from the connection point (3) between the first wall part (1) and the adjacent second wall part (2), which connection point (3) is nearest to the longitudinal edge (1'). Plate-shaped brackets (4) are arranged at the sides of the first wall parts (1) remote of the materials to be transported at a second distance (c) from the nearest longitudinal edge (1'). The angle ($\alpha$) of inclination between the plane of the bracket (4) and the plane of the first wall part (1) is 60°, and the second pipe (II) has at least one corresponding first wall part (1) which is arranged parallel to the second wall part (2) of the first pipe (I).

6 Claims, 2 Drawing Sheets

(A)

DEVICE FOR THE TRANSPORT OF MATERIALS AND ELECTROSTATIC PRECIPITATION

The invention is directed to a device for transporting materials.

Various devices for transporting materials which are also used as electrostatic precipitators, etc. are known. A device for electrostatic precipitation of mist and dust is described in DE-PS 963868, for example. In this device the walls of the gas ducts are at the same time collector or precipitation electrodes formed by individual structural component parts of porous, nonmetallic material. Ducts for an electrically conductive rinsing liquid pass through the precipitation electrodes, the nonmetallic material being sufficiently porous to enable the surfaces of the precipitation electrodes to be rinsed off with this liquid which penetrates from the ducts to the surface. It is possible to use hollow, four-cornered plates as structural component parts for this purpose. These plates have edges at two opposite sides which are beveled at an angle of 120° and the plates are connected with one another at these sides in the manner of a honeycomb. In this arrangement the individual structural component parts are connected by a thin layer of cementing material arranged along the entire length of the individual honeycombs so as to form a fully self-supporting stable system.

DE-PS 2641114 describes a process for producing a plastic electrostatic filter in a honeycomb shape by joining together hot-pressed plate strips of fiberglass-reinforced polyester having a tongue-and-groove shape in cross section. The individual plate strips are provided with flanges which are connected with one another along the entire length of the honeycomb bundle. The plate strips are either glued together by advantageous use of resin or, insofar as the plate strips are made of thermoplastic material, connected with one another by welding.

U.S. Pat. No. 4,441,897 describes an electrostatic precipitator in which the precipitation electrodes are likewise arranged in the form of a honeycomb grid. Each individual precipitation electrode in this electrostatic precipitator is also connected along the entire length of the honeycomb with the adjacent precipitation electrode.

In the devices mentioned above for transporting materials in which waste gas to be purified is transported within a plurality of honeycomb-like pipes, a disadvantage consists in that to produce the honeycomb grid a rigid connection must be effected e.g. by welding or gluing at a number of locations along the entire length of the pipes to impart sufficient stability to the honeycomb grid. As a rule, the individual structural component parts of the honeycomb grid must be joined manually which is relatively difficult to carry out and highly expensive.

The present invention therefore has the object of providing a stable device for transporting materials in which the individual structural component parts can be joined relatively simply and economically.

The problem upon which the invention is based is solved by a device for transporting materials which has at least a first pipe and a second pipe, each having a six-cornered, honeycomb-shaped flow cross section. The first pipe has two or three first wall parts which are not arranged adjacent to one another and whose longitudinal edges are arranged at a first distance from the respective connection point between the first wall part and the adjacent second wall part lying closest to the longitudinal edge. Plate-shaped brackets are arranged at the sides of the first wall parts remote of the materials to be transported at a second distance from the nearest longitudinal edge and are inclined toward the nearest longitudinal edges. The angle of inclination between the plane of the bracket in question and the plane of the first wall part in question is 60°. The second pipe has at least one corresponding first wall part which is arranged parallel to the second wall part of the first pipe. The surfaces of the brackets of the first wall part of the second pipe which form the respective side the angle of inclination contact a portion of the nearest first wall part of the first pipe.

Transporting material is understood here to mean the conveying of gaseous, liquid or solid substances or mixtures thereof, e.g. suspensions. The first distance is 10 to 50 mm, the second distance is 30 to 150 mm. Surprisingly, it has been found that the individual structural members of the device according to the invention can be joined at relatively low cost and without manual assembly processes. Further, the device for transporting materials, according to the invention, has a relatively high degree of stability so that the materials can be transported at relatively high speed and are balanced by the vibrations brought about by the flow.

In a preferred development of the invention, at least the first pipe and second pipe are made from a metallic work material or an electrically conductive plastic. This has the advantage that the individual pipes of the device according to the invention can be manufactured from one piece and that contaminated waste gases, as transported materials, can be purified electrostatically during transport and the individual pipes act as precipitation electrodes. Lead or aluminum can be used, for example, as metallic work materials. Polyvinyl chloride with added graphite or polypropylene with added graphite can be used, for example, as electrically conductive plastics.

According to another preferred development of the invention, at least the first pipe and the second pipe are connected with one another at the end sides of the brackets by at least one connection point. This step adds to the stability of the device according to the invention.

According to another preferred development of the invention, at least one hollow space between at least a first pipe and a second pipe is filled with foamed material. Polyurethane can be used, for example, as foamed material. If at least one hollow space between at least a first pipe and a second pipe is filled with a foamed material, the first pipe is thermally insulated from the second pipe which simultaneously improves the stability of the device according to the invention.

According to another preferred development of the invention, a flowing medium is directed at least into a hollow space between at least a first pipe and a second pipe. Solid, liquid or gaseous materials may be used as flowing media. This step makes it possible for the materials to be transported to be subjected during transport to thermal treatment depending on the selection of suitable flowing media. The device according to the invention can be used, for example, as a heat exchanger due to this step.

According to another development of the invention the device for transporting materials is used as a precipitation electrode in an electrostatic precipitator. Wet or dry electrostatic filters can be used as electrostatic precipitators for cleaning transported waste gases. When the device for transporting materials, according to the invention, is used as a precipitation electrode in an electrostatic precipitator, waste gas containing harmful substances can be transported and at the same time freed from harmful substances by electrostatic cleaning. When wet electrostatic filters are used, waste gas saturated with steam can be cooled during the cleaning and condensate, as electrically conductive liquid, improves the precipitation of the harmful substances.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
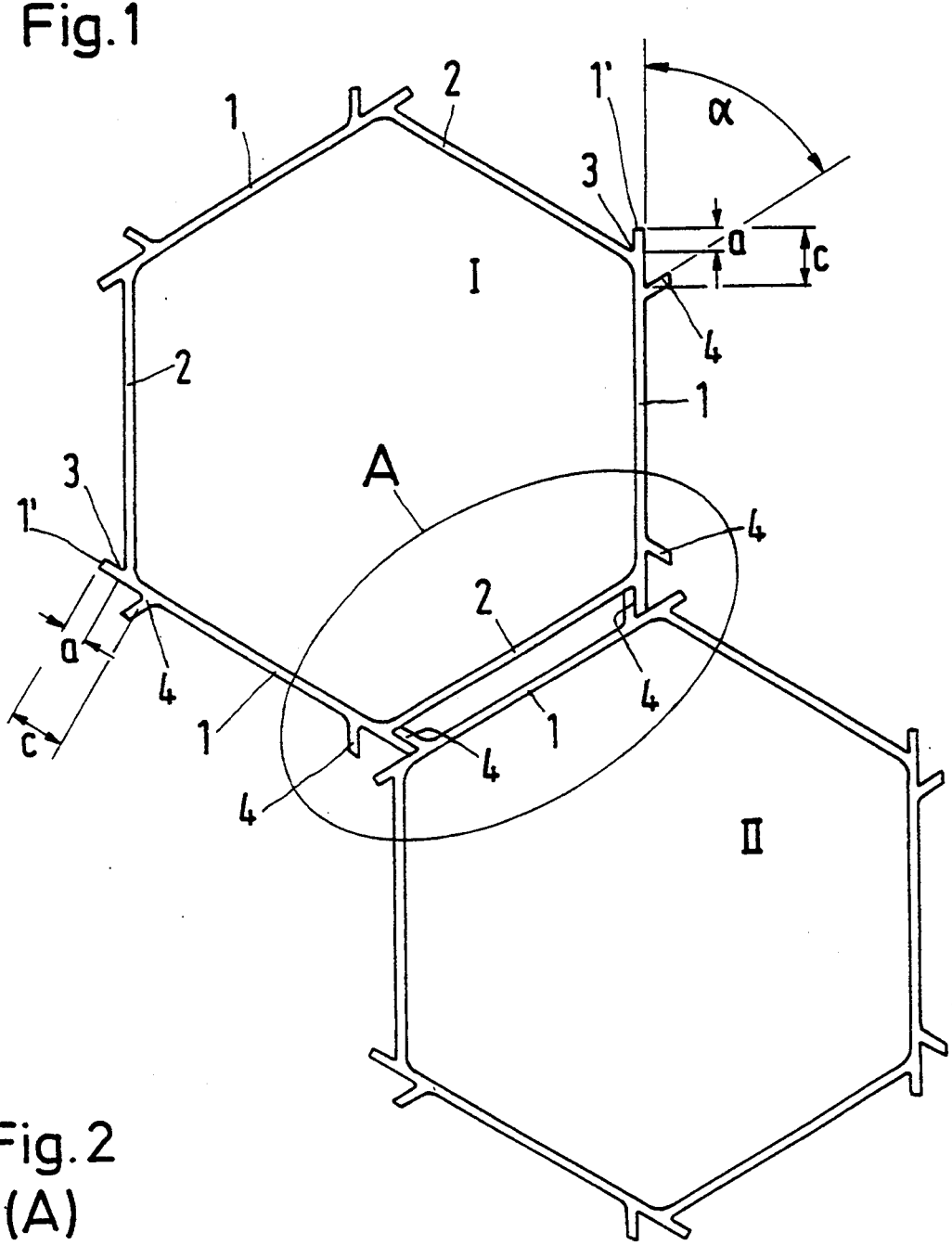
FIG. 1 shows the device according to the invention in cross section with the first and second pipe.

FIG. 1 shows the device for transporting materials, according to the invention, which includes a first pipe (I) and a second pipe (II), each having a six-cornered, honeycomb-shaped flow cross section. The first pipe (I) has three first wall parts (1) and three second wall parts (2). Neither the first wall parts (1) nor the second wall parts (2) are arranged adjacently. The longitudinal edges (1') of the first wall parts (1) are arranged at a first distance (a) from the connection point (3) closest to the longitudinal edge (1') between the first wall part (1) and the adjacent second wall part (2). Plate-shaped brackets (4) which are inclined toward the nearest longitudinal edges (1') are arranged at every first wall part (1) on the side remote of the materials to be transported at a second distance (c) from the nearest longitudinal edge (1'). The angle ($\alpha$) between the plane of the bracket (4) and the plane of the first wall part (1) is 60°. Opposite the second wall part (2) of the first pipe (I), the second pipe (II) has a corresponding first wall part (1) so that these two wall parts are arranged parallel to one another. The surfaces of the brackets (4) of the first wall part (1) of the second pipe (II) forming the respective side of the angle ($\alpha$) of inclination contact a portion of the nearest first wall part (1) of the first pipe (I). When assembling the device according to the invention, the second pipe (II) with its brackets (4) arranged at the first wall part (1) is slid between the first wall parts (1) of the first pipe (I) in the transporting direction of the materials to be transported. The first pipe (I) is connected in a positive engagement with the second pipe (II) vertically to the transporting direction so that relatively difficult joining procedures, e.g. welding or gluing, can be dispensed with along the entire longitudinal axis of the first pipe (I) and second pipe (II). In this way, the device according to the invention can be manufactured in a relatively short time so that the production costs of the device according to the invention can be kept low to a great extent.

Figure 2:
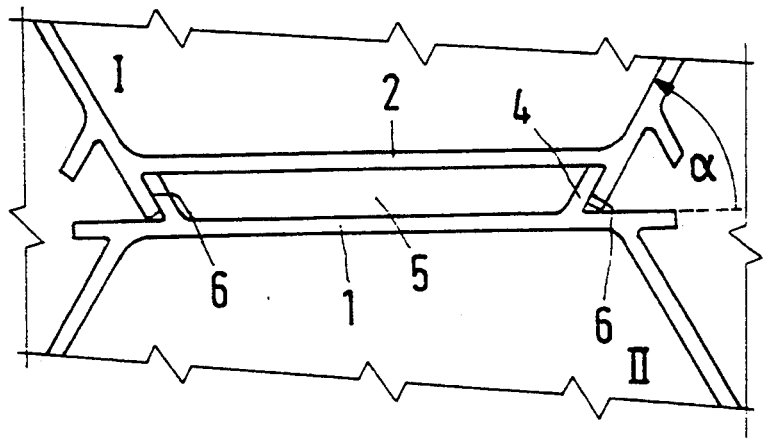
FIG. 2 shows a top view of the first and second pipe according to "A" in FIG. 1.

FIG. 2 shows an enlarged view of the positive-locking connection of the first pipe (I) with the second pipe (II) according to "A" in FIG. 1. The angle ($\alpha$) of inclination between the plane of the bracket (4) and the plane of the first wall part (1) of the second pipe (II) is 60°. A hollow space (5) is formed between the first pipe (I) and the second pipe (II). This hollow space (5) can be filled with foamed material, which increases the stability of the device according to the invention. However, a flowing medium may also be directed through the hollow space (5) so that the materials to be transported can be cooled or heated during transport, depending on the choice of flowing medium. Further, FIG. 2 shows two connection points (6) at which the first pipe (I) and the second pipe (II) can be connected with one another at the end sides of the respective brackets (4), which increases the stability of the device according to the invention.

Figure 3:
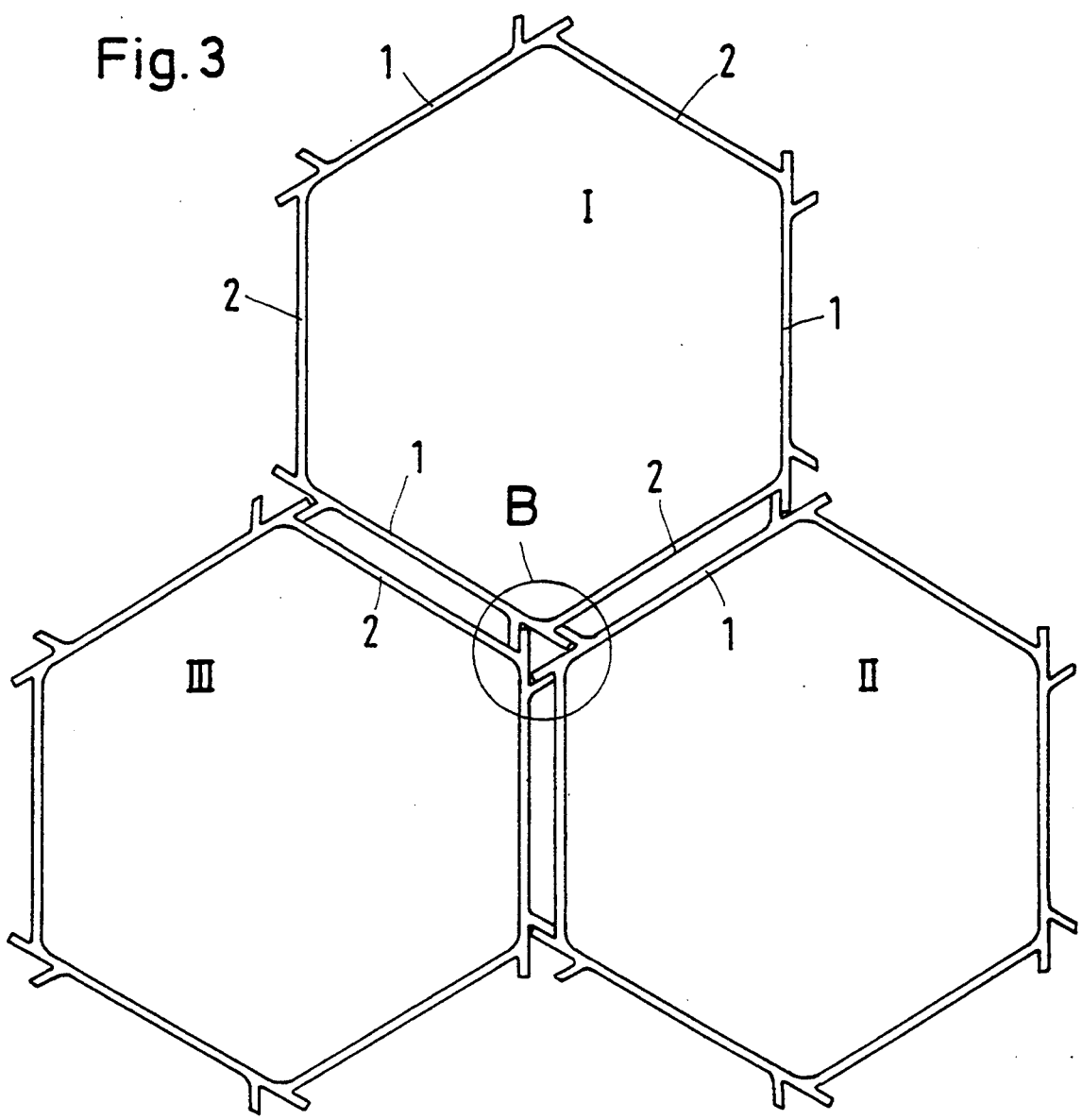
FIG. 3 shows a variant of the device according to the invention in cross section with a first, second and third pipe.

FIG. 3 shows a variant of the device according to the invention in which a third pipe (III) is arranged in addition to the first pipe (I) and the second pipe (II). The construction of the third pipe (III) corresponds to that of the first pipe (I) and second pipe (II).

Figure 4:
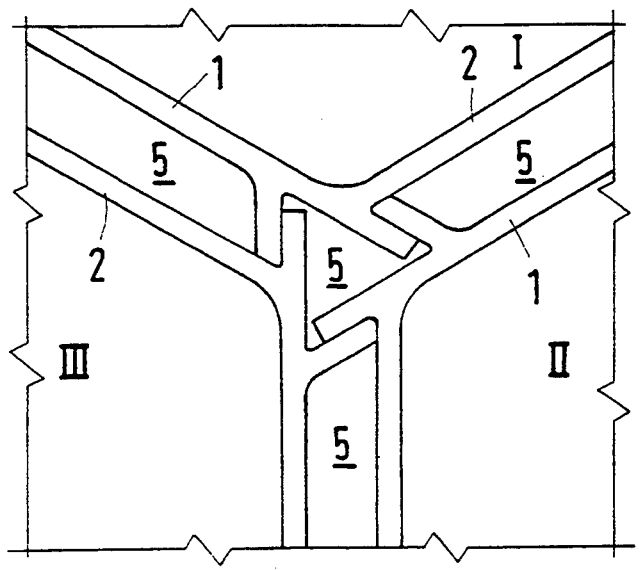
FIG. 4 shows the arrangement of the first pipe relative to the second and third pipes according to "B" in FIG. 3.

FIG. 4 shows the common connection point of the first pipe (I), second pipe (II) and third pipe (III) according to "B" in FIG. 3. The hollow spaces (5) can also be filled with foamed material in this variant of the device according to the invention. Further, it is possible to direct a flowing medium into the hollow spaces (5).

However, the device according to the invention is not limited to the embodiment forms shown in FIGS. 1 to 4. Depending on the amount of material to be transported, an optional number of pipes can be combined with one another.

We claim:

1. Device for transporting materials which has at least a first pipe (I) and a second pipe (II), each having a six-cornered, honeycomb-shaped flow cross section, the first pipe (I) having two or three first wall parts (1) which are not arranged adjacent to one another and whose longitudinal edges (1') are arranged at a first distance (a) from the connection point (3) between the first wall part (1) and the adjacent second wall part (2), said connection point (3) is nearest to the longitudinal edge (1'), and plate-shaped brackets (4) are arranged at the sides of the first wall parts (1) remote from the materials to be transported at a second distance (c) from the nearest longitudinal edges (1') and are inclined toward the nearest longitudinal edges (1'), the angle ($\alpha$) of inclination between the plane of the bracket (4) and the plane of the first wall part (1) is 60°, and the second pipe (II) has at least one corresponding first wall part (1) which is arranged parallel to the second wall part (2) of the first pipe (I), the surfaces of the brackets (4) of the first wall part (1) of the second pipe (II) which form the side of the angle ($\alpha$) of inclination contact a portion of the nearest first wall part (1) of the first pipe (I).

2. Device according to claim 1, in which at least the first pipe (I) and the second pipe (II) are made from a metallic work material or from an electrically conductive plastic.

3. Device according to claim 2, in which said device is a precipitation electrode in an electrostatic precipitator.

4. Device according to claim 1, in which at least the first pipe (I) and the second pipe (II) are connected with one another at the end sides of the brackets (4) by at least one connection point (6).

5. Device according to claim 1, in which at least one hollow space (5) between at least a first pipe (I) and a second pipe (II) is filled with a foamed material.

6. Device according to claim 1, in which a flowing medium is directed at least into a hollow space (5) between at least a first pipe (I) and a second pipe (II).

* * * * *